United States Patent
Corradi

(10) Patent No.: US 7,101,478 B2
(45) Date of Patent: Sep. 5, 2006

(54) FOAM REMOVAL DEVICE

(75) Inventor: Cesare Corradi, Reggio Emilia (IT)

(73) Assignee: Aqua&Co S.R.L., Reggio Emilia (IT)

( * ) Notice: Subject to any disclaimer, the term of this patent is extended or adjusted under 35 U.S.C. 154(b) by 177 days.

(21) Appl. No.: 10/925,961

(22) Filed: Aug. 26, 2004

(65) Prior Publication Data

US 2005/0067354 A1    Mar. 31, 2005

(30) Foreign Application Priority Data

Sep. 30, 2003 (IT) .......................... RE2003A0093

(51) Int. Cl.
*C02F 1/24* (2006.01)
*A01K 63/04* (2006.01)
*B01D 19/02* (2006.01)

(52) U.S. Cl. ..................... 210/221.2; 210/169; 210/94; 96/177; 96/178

(58) Field of Classification Search ............. 210/221.2, 210/169, 94; 96/177, 178
See application file for complete search history.

(56) References Cited

U.S. PATENT DOCUMENTS

| | | | | |
|---|---|---|---|---|
| 3,719,278 A | * | 3/1973 | Kolfertz | 210/169 |
| 4,834,872 A | * | 5/1989 | Overath | 210/151 |
| 5,665,227 A | * | 9/1997 | Watt | 210/169 |
| 5,800,704 A | * | 9/1998 | Hansen | 210/169 |
| 6,303,028 B1 | * | 10/2001 | Marks et al. | 210/169 |
| 6,869,530 B1 | * | 3/2005 | Venezia | 210/221.2 |

FOREIGN PATENT DOCUMENTS

FR   2 301 291       9/1976
SU     1011266    *  4/1983

OTHER PUBLICATIONS

Database WPI, Section Ch, Week 198750, Derwent Publications Ltd., London, GB, AN 1987-354125, XP-002312875 and SU 1 308 355, May 7, 1987 (abstract).
Database WPI, Section Ch, Week 198121, Derwent Publications Ltd., London, GB, AN 1981-37722D, XP-002312876 and SU 762 919, Sep. 15, 1980 (abstract).

* cited by examiner

*Primary Examiner*—Thomas M. Lithgow
(74) *Attorney, Agent, or Firm*—Young & Thompson

(57) ABSTRACT

The device includes a tubular body, superiorly closed by a cover, having a truncoconical transversal section and a vertical lie, internally of which a separator wall is housed, for collecting liquid, having an inlet mouth and a drainage channel. The device includes a rotating organ for separating polluting substances, which rotating organ is closed internally of elements for collecting and percolating the polluting substances.

9 Claims, 1 Drawing Sheet

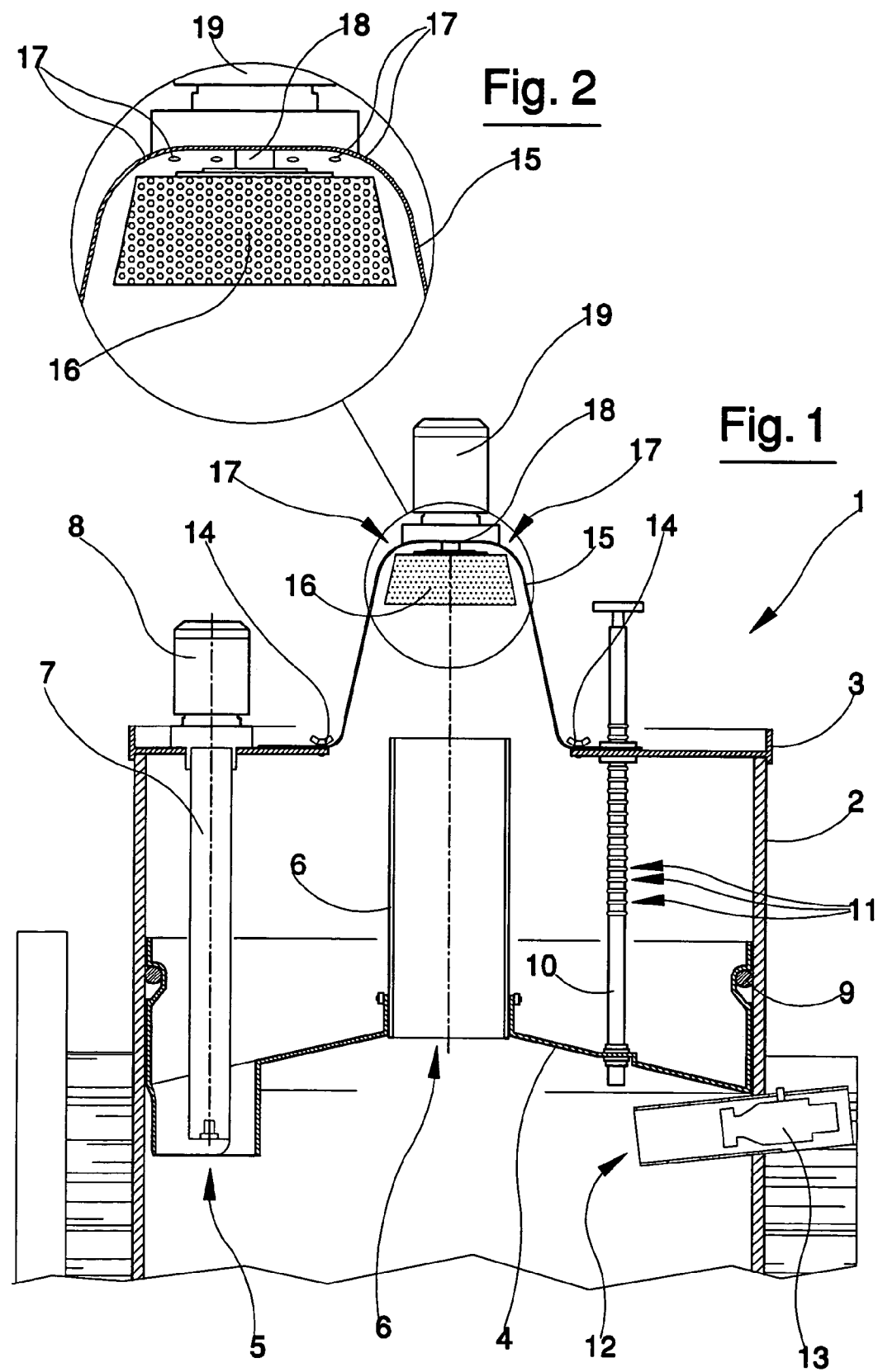

FOAM REMOVAL DEVICE

BACKGROUND OF THE INVENTION

The invention relates to a device for removing foam and polluting light solid substances with high surface tension.

The device is applicable as a separator of foam and polluting solid substances found in freshwater, brackish and salt water environments, generally quite shallow, such as for example ponds or small lakes, either closed or semi-closed, in which processes of oxygenisation or mechanical mixing of waters is done, which operations generate foamy suspensions, or where there might be solid polluting substances, such as for example feathers, or twigs, or algae, or leaves, which remain in the water as the environment is a closed one.

The prior art teaches a patent application, Italian patent RE2002A000015, entitled "A Device for Foam Removal", filed by the same applicant and concerning a device having a like aim to that of the present application.

The above application, having been installed in appropriate environments, has displayed a number of drawbacks connected with both the conformation and the positioning, internally of the device, of a rotating organ, acting as a means of separation of the liquid foam, both in relation to the presence of solid polluting substances, or feathers, twigs, algae or leaves, which mix up with the foam to be removed, and the impossibility of visually observing the state of repair and efficiency of the invention. The conformation of the known rotary separator organ is somewhat like the drum of a washing machine, or an upturned drinking beaker having perforated lateral walls terminating radially to configure a circular-crown recess.

The drum, which is located internally of the bearing structure, faces the inlet conduit of the polluting substances at a height at which the lateral walls which delimit the drum surround the outlet of the inlet conduit. The conformation of the drum and its positioning have a first disadvantage of trapping polluting solid substances inside the drum. The solid substances trapped within the drum can cause obstructions of the perforated lateral walls with a negative effect on the separation performance of the device, to a point where, following an excessive accumulation of the substances, imbalances in the rotation can lead to stress fatigue of the drum shaft.

The stage performed after breaking up the foam is their evacuation, through a drainage channel which uses the force of gravity to discharge, or might be provided with an outlet conduit which discharges by mechanical aspiration.

A further disadvantage of the above device of the prior art, in relation to the location of the drum internally of the bearing structure, is that it is not possible to keep a real-time check on the efficiency of the machine. Consequently, the noting of any faults might occur after the machine has stopped and the drum cover has been removed.

The main aim of the present invention is to realise a device that enables direct vision of the machine performance, i.e. the efficiency of the foam separation from the liquid.

A further aim of the invention is to adopt a rotary element which does not trap polluting solid elements, safeguarding the correct functioning of the machine.

A further aim is to realise a machine which enables maintenance and cleaning operations to be carried out on the rotary organ without having to laboriously strip the machine down.

These aims and advantages and more besides are all achieved by the invention as it is characterised in the appended claims.

SUMMARY OF THE INVENTION

The device comprises a tubular body, superiorly closed by a cover, having a truncoconical transversal section and a vertical lie, internally of which a separator wall is housed, for collecting liquid, having an inlet mouth and a drainage channel. The device comprises a rotating organ for separating polluting substances, which rotating organ is closed internally of means for collecting and percolating the polluting substances.

BRIEF DESCRIPTION OF THE DRAWINGS

Further characteristics and advantages of the present invention will better emerge from the detailed description that follows of a preferred but non-exclusive embodiment of the invention, illustrated purely by way of non-limiting example in the accompanying figures of the drawings, in which:

FIG. 1 is a vertical section of the device made according to the invention;

FIG. 2 is a vertical section of a detail of the device made according to the invention.

DESCRIPTION OF THE PREFERRED EMBODIMENTS

With reference to the above figures of the drawings, 1 denotes in its entirety a device for foam removal.

The apparatus comprises a tubular body 2, preferably having a truncoconical section, which is superiorly closed by a cover 3 having a central hole.

The tubular body includes a chamber inside which, when the machine is operating, the foamy substances to be removed are contained.

A truncoconical separator wall 4 is housed internally of the tubular body 2, which separator wall 4 has an inclined bottom which, as viewed in FIG. 1, drops towards the periphery of the tubular body 2.

The separator wall 4 peripherally includes a drainage well 5 for collecting any polluting substances captured, whether solid or liquid, and centrally exhibits an inlet mouth 6, to which a vertical neck 6' is connected, which neck 6' has a circular transversal section with end parts lying horizontally, in order to convey the foamy substances to be removed.

Means for conveying are arranged internally of the drainage well 5, vertically external of the tubular body 2, for transporting the substances separated by the rotary action of the drum.

The means are preferably constituted by a screw 7 powered by a first motor 8.

An annular seal 9 is housed on the internal walls of the tubular body 2 and externally of the separator wall 4. The seal 9 guarantees a peripheral seal of the two telescopically-moving elements.

The separator wall 4 translates vertically with respect to the tubular body 2 thanks to a pair of vertical rods 10 which are inferiorly solid to the separator wall 4 and pass through the cover 3.

Known-type means for fastening are insertable in annular gullets 11 fashioned on the vertical rods 10, and can be used to position the separator wall at various heights with respect to the cover 3.

Below the separator wall 4 and laterally of the tubular body 2 there is, on the walls of the tubular body 2, a tangential inlet 12, of known inclination and form, in which a water oxygenation or mechanical water mixing plant 13 is contained, of known type, operation of which leads to formation of foams internally of the tubular body 2.

A bell element 15 is fastened on the cover 3, peripherally to the central hole, by means of screws 14. The bell element 15 is preferably transparent and has at a summit thereof a hole for connection of a rotating organ 16, and, externally thereof, a plurality of small breather holes 17 for letting out excess air.

The bell element 15 has a base diameter which is greater than a diameter of the inlet mouth 6.

The rotating organ 16 is closed within the bell element 15 at a height which is close to the summit of the bell element 15. The rotating organ 16 is cupola- or upturned drum-shaped, and defines a convex chamber having perforated walls.

The rotating organ 16 is driven via a shaft 18 by a second motor 19 located at the summit of the bell element 15.

The shaft 18 is vertical.

The bell element 15 and the rotating organ 16 are coaxial with the inlet mouth 6 of the separator wall 4.

The device functions as in the following description.

The oxygenation device 13 introduces air or oxygen into the tubular body 2, impressing a tangential velocity to the water container internally of the tubular body 2.

The water contained in the tubular body begins to move in a vortex.

This whirlpool motion causes formation of foam and channels the polluting light solid substances towards the centre of the vortex.

The formation of the foam is enhanced by introduction of air, which is done by the oxygenation device 13.

The foam which forms together with the solid light substances rise along the inlet mouth 6 until they reach the rotating organ after crossing the bell element 15.

The foam bubbles, in contact with the perforated walls of the rotating organ 16, break up and the resulting liquid is deposited, together with the solid substances, on the bell element 15.

Subsequently the liquid is percolated and the solids are deposited on the bottom of the separator wall 4, finishing by being conveyed internally of the drainage well 5.

This percolation affords the device the further advantage of breaking up heavy foam which, due to the weight thereof, cannot rise towards the rotating organ 15 and fall onto the bottom of the separator wall 4 at edges of the vertical neck 6'.

In the drainage well 5, the separated substances are raised outside the tubular body 2 by the screw 7.

What is claimed is:

1. An improved foam removal device, comprising:
   a tubular body which is vertically orientated and superiorly closed by a cover having a central circular opening;
   a separator wall for collecting liquid, housed internally of the tubular body and having at least one peripheral drainage well and affording at least one central inlet mouth for substances to be removed;
   at least one rotating organ for separation of foamy substances which rotating organ overlies and is coaxial with respect to the inlet mouth and the central circular opening of the cover;
   characterised in that it comprises means for collecting and percolating polluting substances which means for collecting and percolating are a bell element which envelops the rotating organ.

2. The improved device of claim 1, characterised in that the bell element is preferably transparent.

3. The improved device of claim 1, characterised in that the bell element is peripherally connected to the central circular opening of the cover by connecting screws.

4. The improved device of claim 1, characterised in that a terminal portion of the bell element has a diameter which is greater than a diameter of the inlet mouth.

5. The improved device of claim 1, characterised in that the bell element exhibits at a summit thereof a plurality of breather holes.

6. The improved device of claim 1, characterised in that a motor is mounted superiorly on the bell element.

7. The improved device of claim 1, characterised in that the rotating organ is preferably shaped as a cupola or upturned basket, and has perforated walls.

8. The improved device of claim 7, characterised in that a largest and terminal diameter of the perforated walls is greater than a diameter of the inlet mouth of the separator wall.

9. An improved foam removal device, comprising:
   a tubular body which is vertically orientated and superiorly closed by a cover having a central circular opening;
   a separator wall for collecting liquid, housed internally of the tubular body and having at least one peripheral drainage well and affording at least one central inlet mouth for substances to be removed;
   at least one annular seal for peripherally sealing the tubular body and the separator wall;
   at least a pair of vertical rods for translating the separator wall with respect to the cover, which at least a pair of vertical rods is inferiorly connected to the separator wall and which superiorly passes through the cover;
   at least one rotating organ for separating foamy substances which at least one rotating organ is above and coaxial to the inlet mouth and the central circular opening of the cover;
   a motor for powering a rotary motion of the rotating organ;
   characterised in that it comprises means for collecting and percolating polluting substances which means for collecting and percolating are a bell element which envelops the rotating organ.

* * * * *